(12) United States Patent
Kim et al.

(10) Patent No.: US 7,940,287 B2
(45) Date of Patent: May 10, 2011

(54) FLAT PANEL DISPLAY AND A METHOD THEREOF

(75) Inventors: Yong Il Kim, Suwon-Si (KR); Jae Hwan Chun, Suwon-Si (KR); Sang Hyeok Lee, Cheonan-Si (KR)

(73) Assignee: Samsung Electronics Co., Ltd. (KR)

( * ) Notice: Subject to any disclaimer, the term of this patent is extended or adjusted under 35 U.S.C. 154(b) by 898 days.

(21) Appl. No.: 11/844,429

(22) Filed: Aug. 24, 2007

(65) Prior Publication Data

US 2008/0048958 A1     Feb. 28, 2008

(30) Foreign Application Priority Data

Aug. 24, 2006    (KR) .................. 10-2006-0080674

(51) Int. Cl.
    *G09G 5/00*       (2006.01)
    *G09G 3/36*       (2006.01)
    *G02F 1/1333*     (2006.01)

(52) U.S. Cl. ............ 345/905; 349/58; 345/87; 345/102

(58) Field of Classification Search ................. 345/905, 345/87, 102; 349/58, 59, 60, 64, 70; 362/246, 362/632, 600; 248/276.1, 278.1
See application file for complete search history.

(56) References Cited

U.S. PATENT DOCUMENTS

| | | | |
|---|---|---|---|
| 5,432,626 A * | 7/1995 | Sasuga et al. .................. | 349/58 |
| 6,507,377 B1 | 1/2003 | Jung | |
| 6,870,582 B2 * | 3/2005 | Hayashimoto et al. ......... | 349/58 |
| 2003/0122992 A1 * | 7/2003 | Hayashimoto et al. ......... | 349/58 |

FOREIGN PATENT DOCUMENTS

| | | |
|---|---|---|
| CN | 1467542 A | 1/2004 |
| EP | 1372021 A1 | 12/2003 |
| JP | 2002303851 | 10/2002 |
| JP | 2005091821 | 4/2005 |
| JP | 2005321614 | 11/2005 |
| KR | 1020000045981 | 7/2000 |
| KR | 1020030020184 | 3/2003 |
| KR | 1020050099221 | 10/2005 |
| KR | 1020050099692 | 10/2005 |
| KR | 1020050204545 | 11/2005 |

OTHER PUBLICATIONS

European Search Report; EP07016643; Apr. 2, 2008.

* cited by examiner

*Primary Examiner* — Kevin M Nguyen
(74) *Attorney, Agent, or Firm* — Cantor Colburn LLP

(57) ABSTRACT

A flat panel display including a first mold frame and a bottom chassis. The first mold frame includes a first base plate with an inside region opened and a plurality of first coupling members protruding from a rear side of the first base plate. The bottom chassis includes a second base plate, a plurality of sidewalls extending from the second base plate and a plurality of second coupling members formed on the plurality of sidewalls and coupled with the plurality of first coupling members.

17 Claims, 14 Drawing Sheets

FLAT PANEL DISPLAY AND A METHOD THEREOF

This application claims priority to Korean Patent application No. 2006-0080674 filed on Aug. 24, 2006, and all the benefits accruing therefrom under 35 U.S.C. §119, the contents of which are herein incorporated by reference in its entirety.

BACKGROUND OF THE INVENTION

1. Field of Invention

The present invention relates to a flat panel display, and more particularly, to a flat panel display including a coupling structure for a mold frame and a bottom chassis.

2. Description of the Prior Art

Among flat panel displays, a liquid crystal display ("LCD") is more widely used due to its features such as lightweight, slim structure, low power consumption, full-color, high resolution and the like. Recently, an LCD is used in a computer, notebook, personal digital assistant ("PDA"), phone, television ("TV"), audio/video equipment or the like. Such an LCD controls light transmission quantities according to image signals applied to a plurality of control switches arranged in a matrix form, thereby displaying desired images on a panel of the LCD.

A conventional LCD includes a mold frame for supporting an LCD panel and receiving a plurality of optical sheets and a bottom chassis coupled with the mold frame. Since the mold frame covers the bottom chassis to be coupled therewith, a sidewall of the mold frame should extend as much as a length of a sidewall of the bottom chassis. Thus, the material cost of the mold frame is increased, and as a result, the manufacture cost of the LCD is also increased. In addition, since the sidewall of the mold frame covers the sidewall of the bottom chassis and thus a contact area between a top chassis and the bottom chassis is very narrow, there is a limit to improving electromagnetic interference ("EMI").

BRIEF SUMMARY OF THE INVENTION

An exemplary embodiment provides a flat panel display including a coupling structure for a mold frame and a bottom chassis capable of improving electromagnetic interference ("EMI") together with reducing the material costs of the mold frame and/or the bottom chassis.

In an exemplary embodiment there is provided a flat panel display including a first mold frame and a bottom chassis. The first mold frame includes a first base plate with an inside region opened and a plurality of first coupling members protruding from a rear side of the first base plate. The bottom chassis includes a second base plate, a plurality of sidewalls extending from the second base plate and a plurality of second coupling members formed on the plurality of sidewalls and coupled with the plurality of first coupling members.

In an exemplary embodiment, each of a portion of the plurality of sidewalls of the bottom chassis may include a first bending surface bent and extending in a first direction from the second base plate, a second bending surface bent and extending in a second direction from the first bending surface and a third bending surface bent and extending in a third direction from the second bending surface.

In an exemplary embodiment, the bottom chassis may further include a second mold frame coupled to a remaining portion of the plurality of sidewalls of the bottom chassis. The second mold frame includes a first sidewall, a second sidewall formed to be bent from the first sidewall and a third sidewall formed to be bent from the second sidewall.

In an exemplary embodiment, the second coupling member may be formed on the second bending surface of the bottom chassis.

In an exemplary embodiment, the second bending surface may be formed parallel to the second base plate.

In an exemplary embodiment, the second coupling member is formed on the second sidewall of the second mold frame.

In an exemplary embodiment, each of the first coupling members may include a coupling plate including a coupling groove formed therein. Each of the second coupling members may include a hook plate extending in a direction from the bottom chassis towards the first mold frame and a hook protruding from the hook plate. The hook of the second coupling member is coupled with the coupling groove of the first coupling member.

In an exemplary embodiment, each of the first coupling members may include a protrusion and each of the second coupling members includes a coupling hole into which the protrusion is inserted.

In an exemplary embodiment, the coupling hole may be formed corresponding to the shape of the protrusion and the coupling hole has a polygonal or circular shape.

In an exemplary embodiment, the protrusion may include a first protrusion having a first body vertically extending from the rear side of the first base plate, a first head formed at a distal end of the first body, a second head arranged crossing the first head, and a third head arranged crossing the first head and opposing to the second head.

In an exemplary embodiment, the second and third heads may be respectively formed on opposing surfaces of the first head and arranged spaced apart from the first body and the first head by a predetermined length.

In an exemplary embodiment, the second and third heads may be integrally formed into a single unit, and the second and third heads integrally formed may be coupled into a groove formed in a distal end of the first head.

In an exemplary embodiment, each head may taper in a direction from the rear side of the first base plate towards the distal end.

In an exemplary embodiment, the protrusion may include a second protrusion including at least two second bodies vertically extending from the rear side of the first base plate and a head respectively formed at a distal end of each of the second bodies.

In an exemplary embodiment, the second bodies may be spaced apart from each other, and each of the heads may taper in a direction from the rear side of the first base plate towards the distal end.

In an exemplary embodiment, the protrusion may include a third protrusion including a third body vertically extending from the rear side of the first base plate and a head formed at a distal end of the third body.

In an exemplary embodiment, the head may taper in a direction from the rear side of the first base plate towards the distal end.

In an exemplary embodiment, the flat panel display may further include a display panel disposed over the first mold frame and displaying images, and a top chassis coupled with the bottom chassis and covering the flat panel display panel. A sidewall of the top chassis is coupled to a sidewall of the bottom chassis and the sidewall of the top chassis contacts the sidewall of the bottom chassis.

In an exemplary embodiment, the flat panel display panel may include a liquid crystal display panel.

In an exemplary embodiment, the flat panel display may further include a backlight unit providing light to the liquid crystal display panel.

An exemplary embodiment provides a method of forming a panel display. The method includes forming first coupling members on a first mold frame, forming second coupling members on a bottom chassis and coupling the first mold frame to the bottom chassis. The first coupling members protrude in a direction from a rear side of the first mold frame towards the bottom chassis. The bottom chassis includes a second base plate and a sidewall portion parallel to the second base plate and the second coupling members are formed on the sidewall portion. A first coupling member of the first mold frame is coupled to a second coupling member of the bottom chassis.

BRIEF DESCRIPTION OF THE DRAWINGS

The above and other objects, features and advantages of the present invention will become apparent from the following description of preferred embodiments given in conjunction with the accompanying drawings, in which:

FIGS. 7A and 7B are perspective and sectional views, respectively, showing an exemplary embodiment of a bottom chassis formed with a coupling hole to be coupled with the protrusion;

DETAILED DESCRIPTION OF THE INVENTION

Figure 1A:
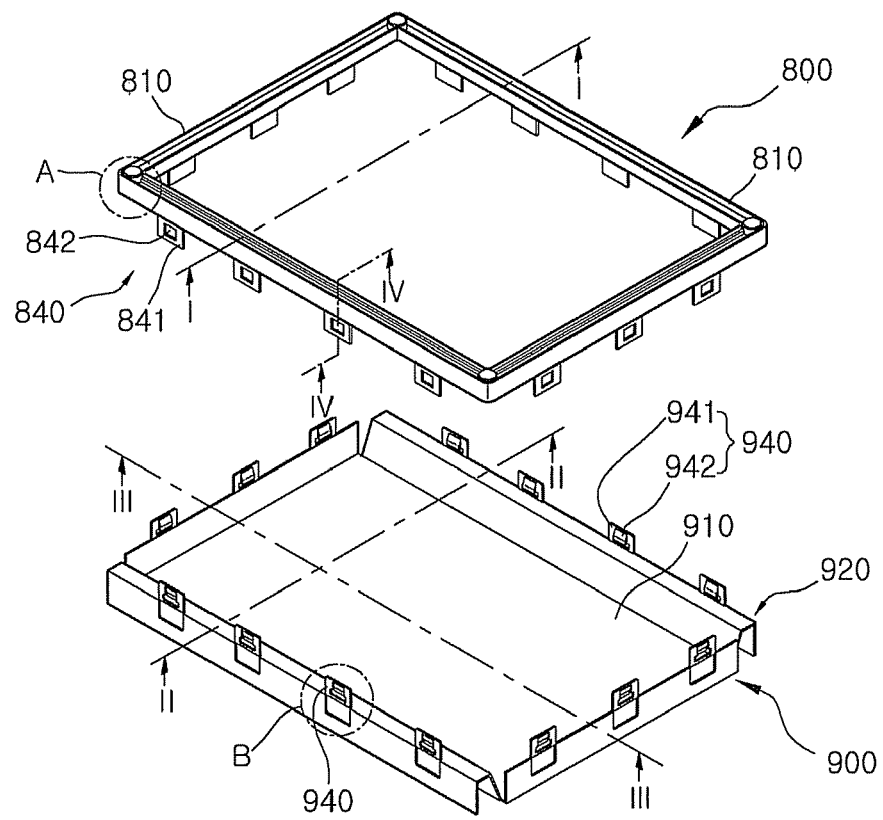
FIG. 1A is an exploded perspective view showing an exemplary embodiment of a liquid crystal display ("LCD") according to the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below", "lower", "under," "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "under" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein. Unless defined otherwise, technical and scientific terms used herein have the same meaning as is commonly understood by one of skill in the art to which this invention belongs.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Hereinafter, preferred embodiments of the present invention will be described in detail with reference to the accompanying drawings.

Figure 1B:
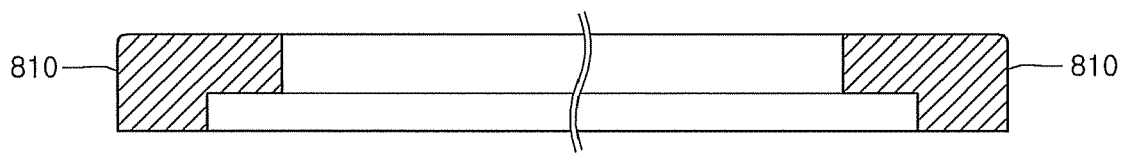
FIG. 1B is a cross-sectional view taken along line I-I of a middle mold frame shown in FIG. 1A.
Figure 1C:
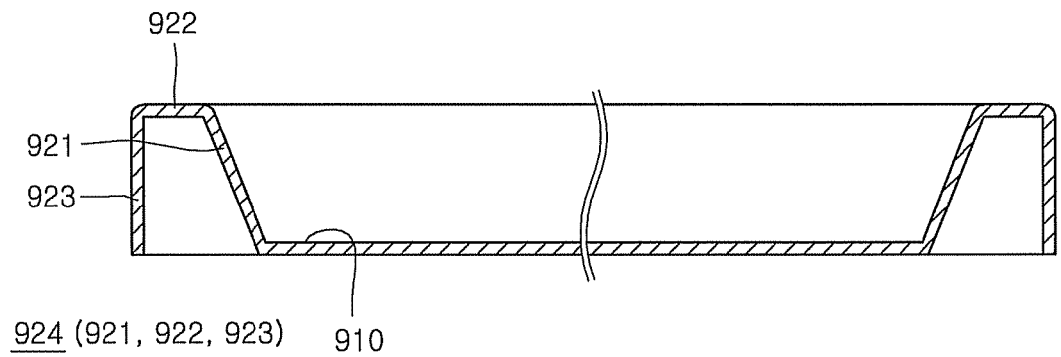
FIGS. 1C and 1D are cross-sectional views taken along lines II-II and III-III of a bottom chassis shown in FIG. 1A.
Figure 1D:
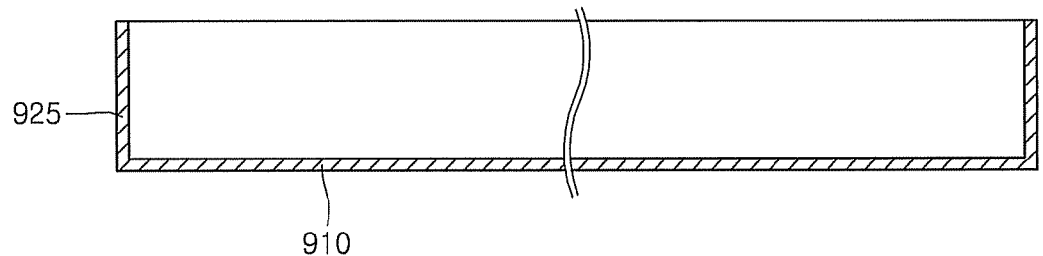

FIG. 1A is an exploded perspective view showing an exemplary embodiment of a liquid crystal display ("LCD") according to the present invention; FIG. 1B is a cross-sectional view taken along line I-I of a middle mold frame shown in FIG. 1A; and FIGS. 1C and 1D are cross-sectional views taken along lines II-II and III-III, respectively, of a bottom chassis shown in FIG. 1A.

Referring to FIGS. 1A to 1D, the LCD includes a bottom chassis 900 having a predetermined receiving space therein and a middle mold frame 800 coupled with the bottom chassis 900.

The middle mold frame 800 includes a first base plate 810 with a predetermined region opened and a plurality of first coupling members 840 protruding from a rear side (e.g., bottom) of the first base plate 810. The first base plate 810 of the middle mold frame 800 is a substantially rectangular plate with a predetermined thickness. An inside of the base plate 810 is also open in a substantially rectangular shape, such that the middle mold frame 800 is formed in a generally quadrangular frame shape. In the illustrated embodiment, the first coupling member 840 is formed to protrude from the rear side of the first base plate 810. In an alternative embodiment, the first coupling member 840 may be formed to protrude on extensions of sidewalls of the first base plate 810.

The bottom chassis 900 includes a second base plate 910 and a plurality of sidewalls 920 extending from the second base plate 910. Each of the sidewalls 920 is formed with a plurality of second coupling members 940. The second coupling members 940 are coupled to the first coupling members 840 formed on the rear side of the first base plate 810 of the middle mold frame 800.

FIG. 1C is a sectional view of a long sidewall 924 among the sidewalls 920 of the bottom chassis 900 and FIG. 1D is a sectional view of a short sidewall 925 among the sidewalls 920 of the bottom chassis 900.

Referring to FIG. 1C, each of two opposite long sidewalls 924 of the bottom chassis 900 includes a first bending surface 921 bent and extending from the second base plate 910 in a first direction, e.g., to be inclined upward at a predetermined angle with respect to the second base plate 910, a second bending surface 922 bent and extending from the first bending surface 921 in a second direction, e.g., in a direction substantially parallel with a left and right extending direction (or, a x-axis direction) of the second base plate 910, and a third bending surface 923 bent and extending from the second bending surface 922 in a third direction, e.g., downward in a normal direction (or, a z-axis direction) to the second base plate 910 and substantially perpendicular to the second base plate 910. In an exemplary embodiment, the second bending surface 922 of the long sidewall 924 of the bottom chassis 900, which is formed substantially in parallel with the second base plate 910, may function as a support surface for seating the first base plate 810 of the middle mold frame 800 thereon.

Referring to FIG. 1D, each of two opposite short sidewalls 925 of the bottom chassis 900 is formed to be bent from the second base plate 910 in a fourth direction, e.g., upward with respect to the second base plate 910.

Each of the second coupling members 940 formed on the sidewalls 920 of the bottom chassis 900 includes a hook plate 941 (see FIGS. 1A and 3A) extending upward toward an outer sidewall of the first base plate 810 of the middle mold frame 800, and a hook 942 (see FIGS. 1A and 3A) protruding from the hook plate 941 towards an inside of the bottom chassis 900 and the middle mold frame 800.

Figure 2A:
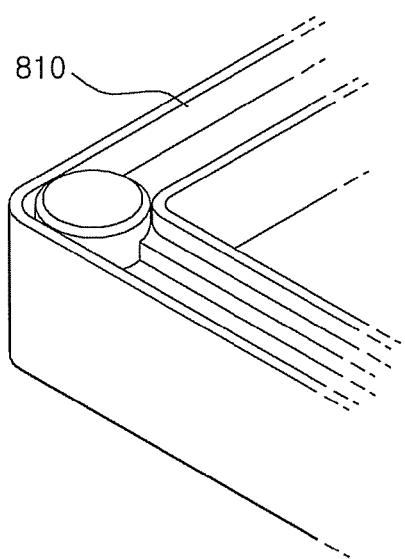
FIG. 2A is a partial enlarged view of a middle mold frame ("A" region) shown in FIG. 1A.
Figure 2B:
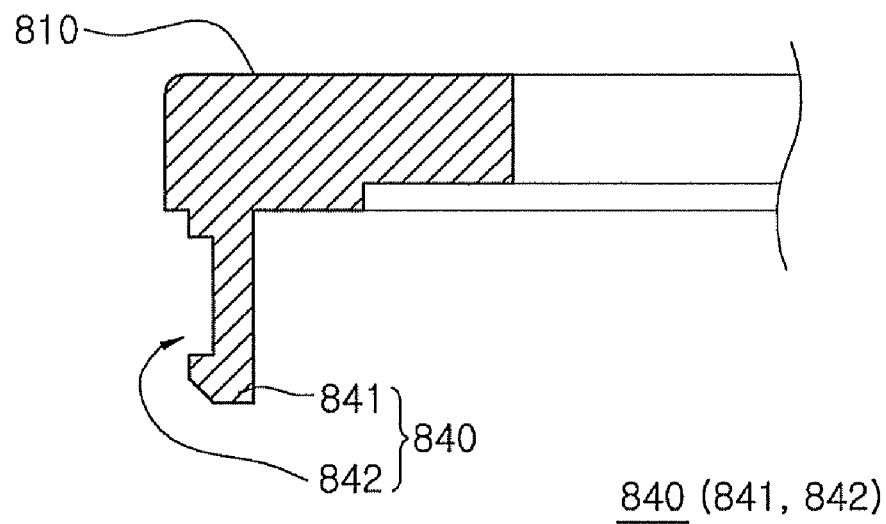
FIG. 2B is a cross-sectional view taken along line IV-IV of a first coupling member shown in FIG. 1A.
Figure 2C:
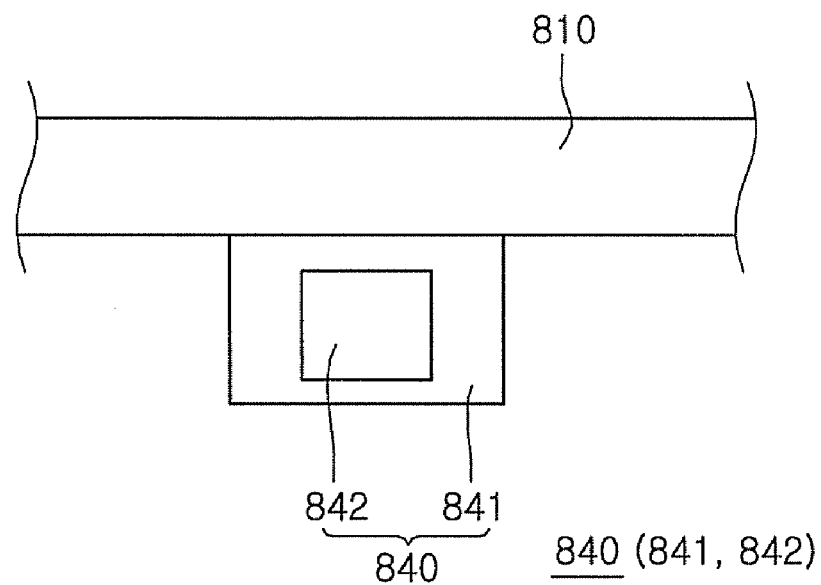
FIG. 2C is a front view of the first coupling member shown in FIG. 1A.
Figure 3A:
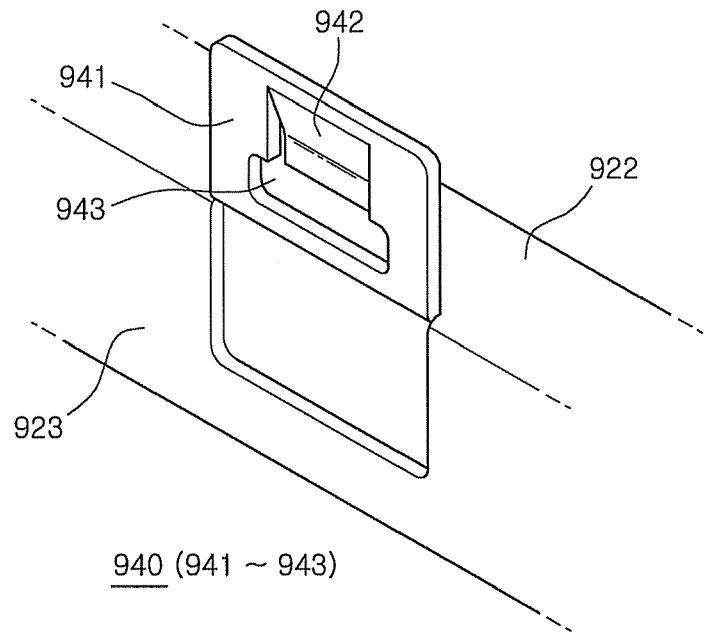
FIGS. 3A and 3B are partial enlarged outer and inner views, respectively, showing a second coupling member ("B" region) formed on the bottom chassis shown in FIG. 1A.
Figure 3B:
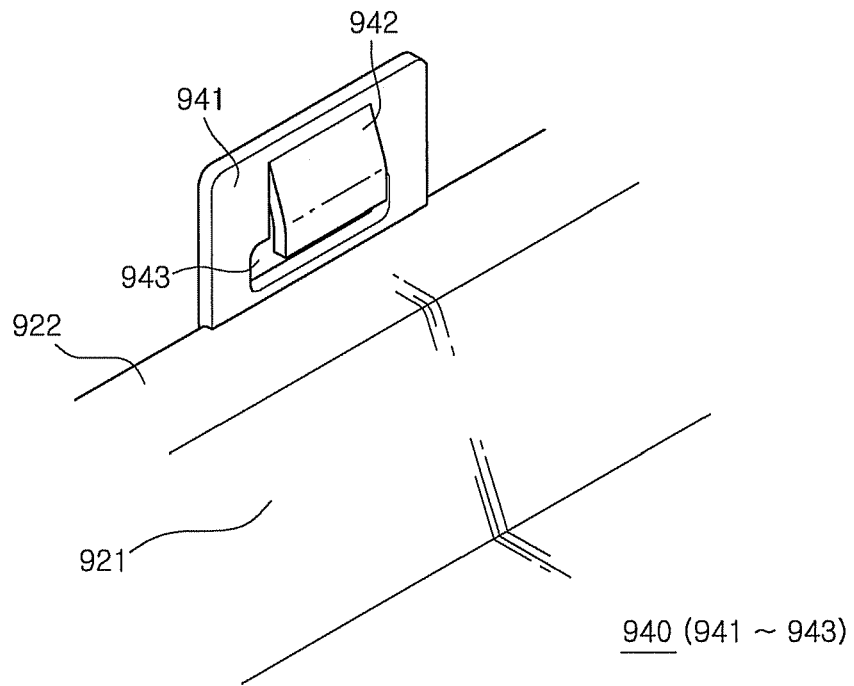

FIG. 2A is a partial enlarged view of the middle mold frame ("A" region) shown in FIG. 1A, FIG. 2B is a cross-sectional view taken along line IV-IV of the first coupling member shown in FIG. 1A, FIG. 2C is a front view of the first coupling member shown in FIG. 1A and FIGS. 3A and 3B are partial enlarged inner and outer views, respectively, showing the second coupling member ("B" region) formed on the bottom chassis shown in FIG. 1A.

Referring to FIGS. 2A to 2C, the middle mold frame 800 has no sidewall extending downward from the first base plate 810 contrary to a conventional mold frame, but a first coupling member 840 is formed on the rear side of the first base plate 810 defining a general frame structure of the middle mold frame 800. The first coupling member 840 includes a rectangular coupling plate 841 and a coupling groove 842 formed in the coupling plate 841 with a predetermined size and depth as in the illustrated embodiments. The first coupling member 840 may be modified in various forms. The first coupling member 840 is coupled with the second coupling member 940, which will be described in detail below.

The middle mold frame 800 of the illustrated embodiments has no sidewall extending downward, so that the material cost required for making the middle mold frame 800 and resultantly the manufacture cost of the LCD are decreased.

Referring to FIGS. 3A and 3B, a plurality of the second coupling members 940 are formed on the sidewall 920 of the bottom chassis 900. Each second coupling member 940 includes the hook plate 941 and the hook 942. Since the second coupling members 940 formed on the long sidewall 924 and the short sidewall 925 of the bottom chassis 900 have substantially the same configuration, only the second coupling member 940 formed on the long sidewall 924 will be described as an exemplary embodiment, and the description of the second coupling member 940 formed on the short sidewall 925 will be omitted for brevity.

The hook plate 941 is formed to extend in a direction opposite (e.g., upward) to the third bending surface 923 of the sidewall 920. The hook 942 is formed to protrude from the hook plate 941 towards the inside of the middle mold frame 800. An opening 943 having a predetermined shape may be formed in a lower end portion of the hook 942. In an exemplary embodiment, the hook plate 941 of the second coupling member 940 is formed to have shape and size substantially corresponding to the coupling plate 841 of the first coupling member 840 and the hook 942 is also formed to have shape and size substantially corresponding to the coupling groove 842 of the first coupling member 840.

As in the illustrated embodiment of FIGS. 3A and 3B, the hook plate 941 is formed in a substantially rectangular shape corresponding to the coupling plate 841 and the hook 942 is also formed corresponding to the shape and size coupling groove 842, e.g., in a rectangular shape. Although it has been described in the illustrated embodiment that the opening 943 is formed in the lower end portion of the hook 942 in order to relatively easily couple the first coupling member 840 of the mold frame 800 and the second coupling member 940 of the bottom chassis 900 with each other, the present invention is not limited thereto. In an alternative embodiment, an opening may be excluded.

The second coupling member 940 may be formed integrally with the sidewall 920 of the bottom chassis 900. In one exemplary embodiment, the second coupling member 940 is formed integrally with the third bending surface 923, by removing a certain portion of the sidewall 920 and then bending the portion. The portion may be removed by any of a number of processes, such as by punching or the like. As used herein, "integrally" is used to indicate formed to be a single unit or piece rather than combining separate elements. In an alternative embodiment, the second coupling member 940 may be separately prepared and then attached to the sidewall 920 of the bottom chassis 900.

Figure 4:
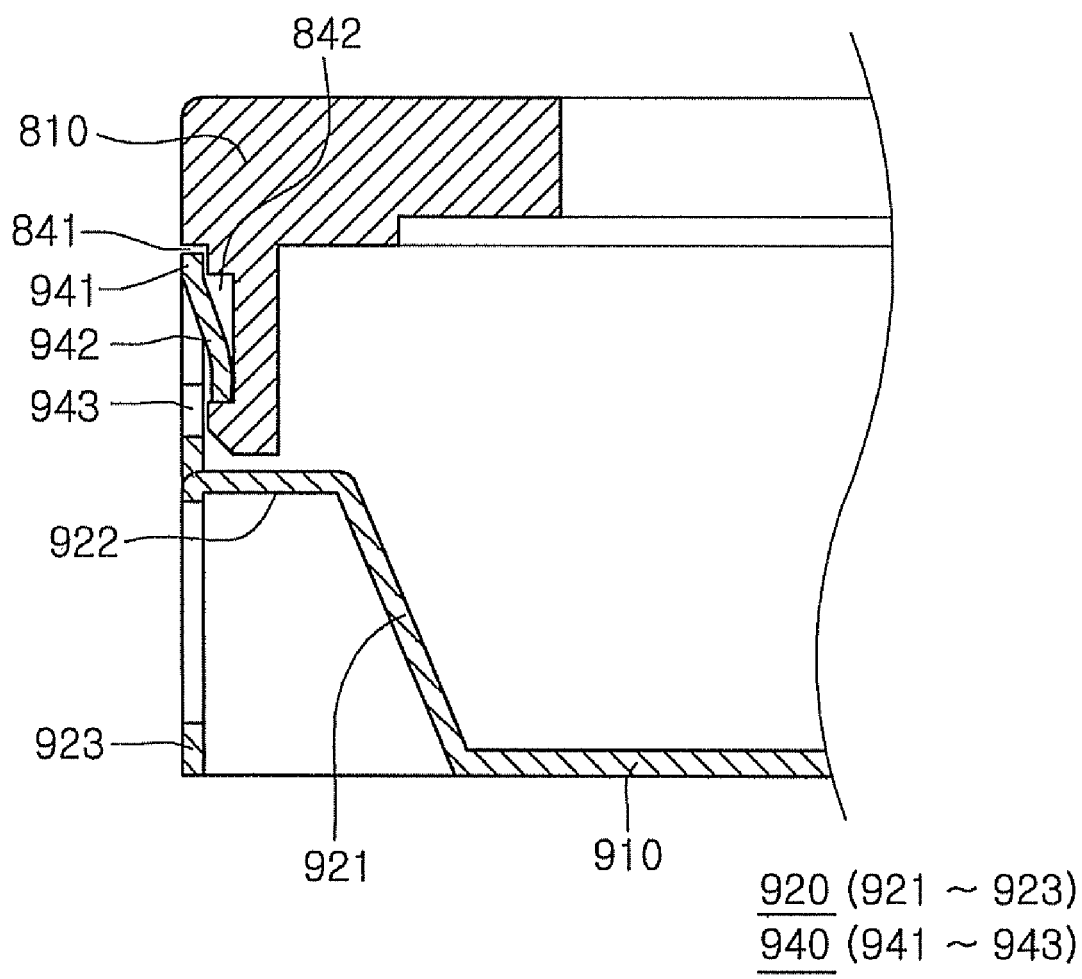
FIG. 4 is a cross-sectional view showing an exemplary embodiment of a coupling state of the middle mold frame and the bottom chassis.

FIG. 4 is a cross-sectional view showing an exemplary embodiment of a coupling state of the middle mold frame and the bottom chassis. Referring to FIG. 4, the second coupling member 940 formed on the sidewall 920 of the bottom chassis 900 is fastened and coupled to the first coupling member 840 formed on the rear side of the first base plate 810 of the middle mold frame 800. The hook 942 of the hook plate 941 of the second coupling member 940 is fastened and coupled to the coupling groove 842 of the coupling plate 841.

As in the illustrated embodiments, a sidewall of the middle mold frame 800 is excluded in order to reduce the material cost corresponding to a sidewall. Also, the middle mold frame 800 does not surround the sidewalls 920 of the bottom chassis 900, thereby maximizing a contact area when a top chassis (not shown) is coupled with the bottom chassis 900, while considerably improving electromagnetic interference ("EMI").

Although the illustrated embodiments have described the coupling structure in which the first coupling member 840 is formed on the middle mold frame 800 and the second coupling member 940 is formed on the bottom chassis 900, in an alternative embodiment, it is possible to couple the middle mold frame and the bottom chassis to each other using a coupling structure in which a first coupling member is formed on the bottom chassis 900 and a second coupling member is formed on the middle mold frame 800.

Figure 5:
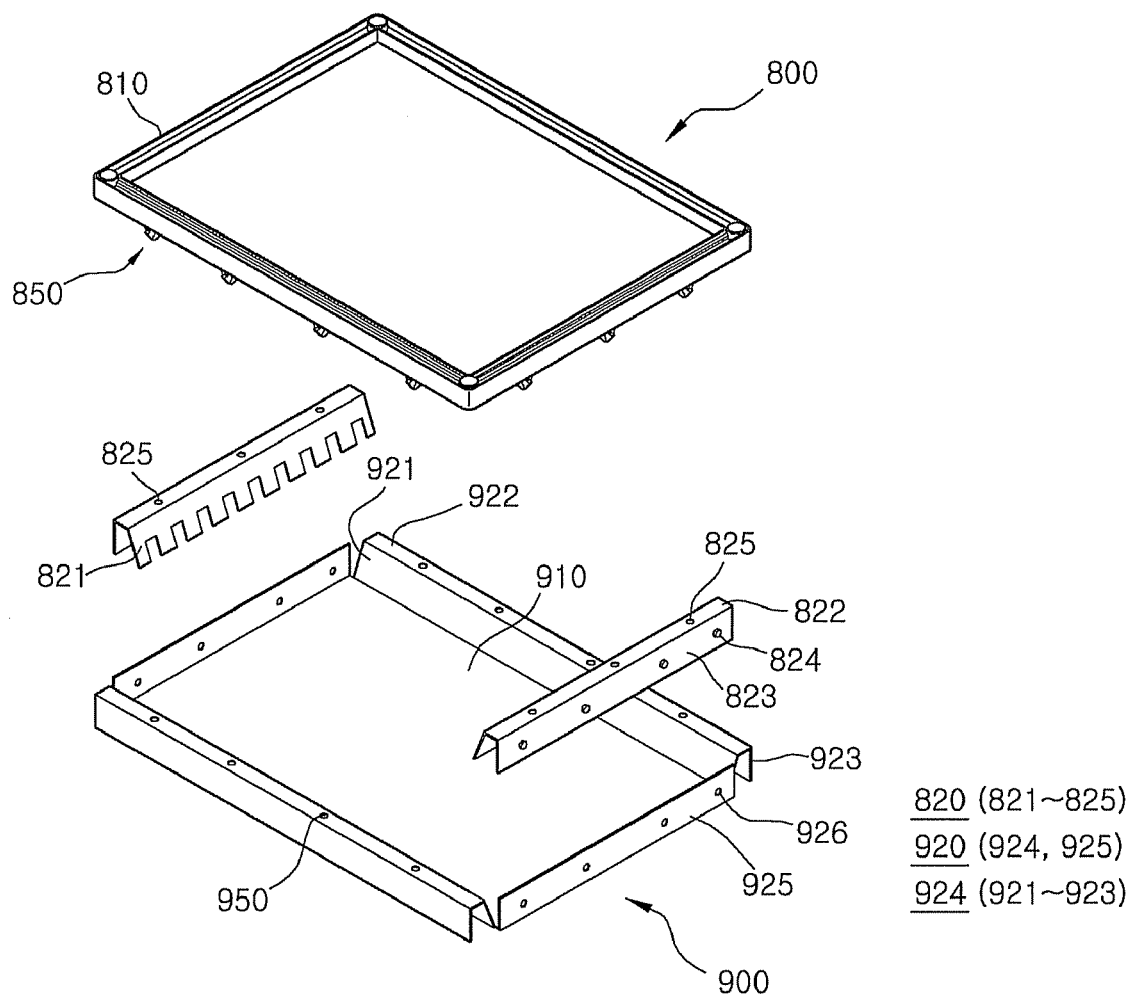
FIG. 5 is an exploded perspective view showing another exemplary embodiment of an LCD according to the present invention.

FIG. 5 is an exploded perspective view showing another exemplary embodiment of an LCD according to the present invention.

Referring to FIG. 5, the LCD includes a bottom chassis 900, side mold frames 820 coupled to the bottom chassis 900 and a middle mold frame 800 coupled to the side mold frames 820 and the bottom chassis 900.

The middle mold frame 800 includes a first base plate 810 with a predetermined region opened and a plurality of protrusions 850 formed on a rear side of the first base plate 810. At least a portion of each protrusion 850 is elastic or can be elastically deformed. The first base plate 810 of the middle mold frame 800 is formed in a substantially rectangular plate shape with a predetermined thickness. An inside of the middle mold frame 800 is also open in a substantially rectangular shape, such that the middle mold frame 800 is formed in a generally quadrangular frame shape.

The bottom chassis 900 includes a second base plate 910 and a plurality of sidewalls 920 extending from the second base plate 910. Among the side walls 920 of the bottom chassis, each of long sidewalls 924 includes a first bending surface 921 bent and extending in a first direction from the second base plate 910, a second bending surface 922 bent and extending in a second direction from the first bending surface 921 and a third bending surface 923 bent and extending in a third direction from the second bending surface 922. Among the sidewalls 920 of the bottom chassis 900, each of short sidewalls 925 is bent and extending from the second base plate 910 in a fourth direction, e.g., upward with respect to the second base plate 910.

The side mold frames 820 are respectively coupled to the short sidewalls 925 of the bottom chassis 900. Each side mold frame 820 is formed in a general bar shape and is bent into a "U" shape corresponding a shape and/or dimensions of the long sidewall 924 of the bottom chassis 900. Hooks 824 are formed on one sidewall of the side mold frame 820 and holes 926 are formed in the short sidewall 925 of the bottom chassis 900, such that the hooks 824 are fastened to the holes 926 to couple the side mold frame 820 to the short sidewall 925 of the bottom chassis 900. The structure of the side mold frame 820 will be described in more detail below with reference to FIGS. 7C and 7D.

As in the illustrated embodiments, the first base plate 810 of the middle mold frame 800 is seated on the second bending surfaces 922 of the long sidewalls 924 of the bottom chassis 900 and second sidewalls 822 of the side mold frames 820, which will be described below. The plurality of protrusions 850 formed on the rear side of the first base plate 810 are inserted into and coupled to coupling holes 950 formed in the second bending surfaces 922 of the long sidewalls 924 of the bottom chassis 900. The protrusions 850 are also inserted and coupled to coupling holes 825 formed in the second sidewalls 822 of the side mold frames 820. The coupling holes 825 and 950 are formed in correspondence to the location, shape and number of protrusions 850 of the middle mold frame 800.

Figure 6A:
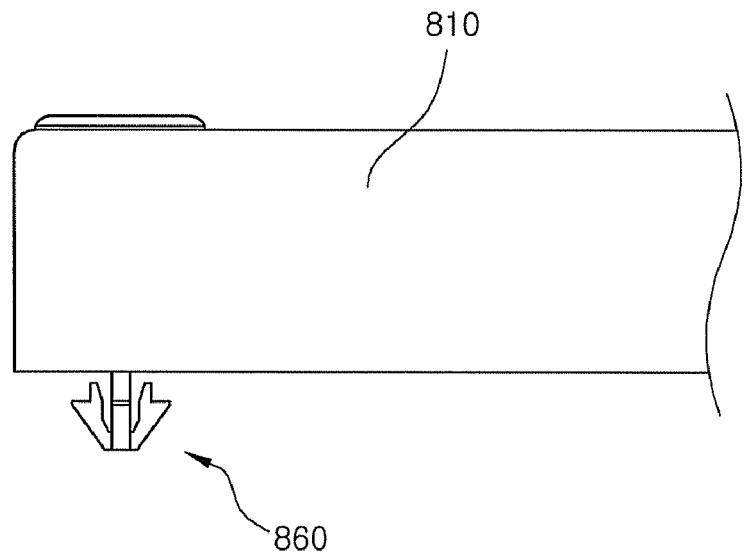
FIGS. 6A and 6B are side and perspective views, respectively, showing an exemplary embodiment of a protrusion according to the present invention.
Figure 6B:
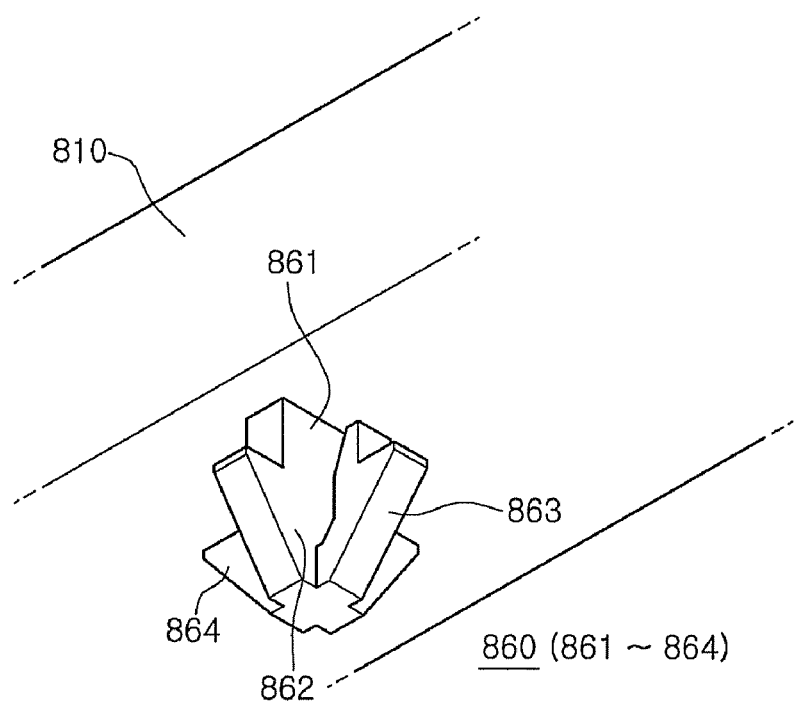
Figure 6C:
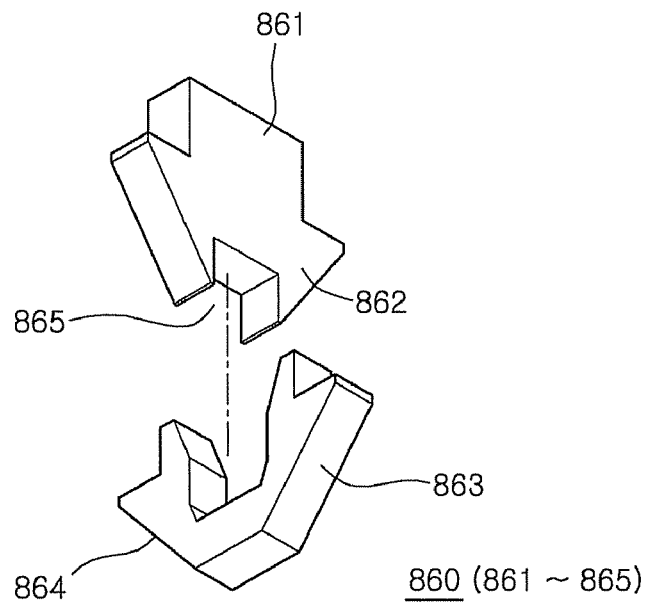
FIG. 6C is an exploded perspective view showing another exemplary embodiment of a protrusion.

FIGS. 6A and 6B are side and perspective views, respectively, showing an exemplary embodiment of a protrusion according to the present invention and FIG. 6C is an exploded perspective view showing another exemplary embodiment of a protrusion.

Referring to FIGS. 6A and 6B, a plurality of first protrusions 860 are formed on the rear side of the first base plate 810 of the middle mold frame 800. Each first protrusion 860 includes a body extending downward and heads with elasticity formed at the end of the body. Each of the first protrusions 860 includes a first body 861, a first head 862, a second head 863 and a third head 864.

The first body 861 of the first protrusion 860 is formed to extend in a substantially vertical direction from the rear side of the first base plate 810 of the middle mold frame 800. The first head 862 is formed at an end of the first body 861. The second head 863 is arranged to cross the first head 862 and the third head 864 is arranged to cross the first head 862 and to be opposite to the second head 863.

The second and third heads 863 and 864 are respectively formed on opposing surfaces of the first head 862 to be spaced apart from the first body 861 and the first head 862 by a predetermined distance, thus having predetermined elasticity. Each head is formed to taper as it goes from the first base plate 810 of the middle mold frame 800 towards a distal end of the first protrusion 860. Advantageously, the first protrusion 860 may be easily inserted into a coupling hole, which will be described in detail below. Also, when each head of the first protrusion 860 penetrates the coupling hole to complete the coupling of the middle mold frame 800 to the bottom chassis 900, the first protrusion 860 restores to its original state to reinforce a coupling force in the coupling hole.

FIG. 6C shows an exploded view of another exemplary embodiment of the first protrusion 860. Although the second and third heads 863 and 864 are separately formed in FIGS. 6A and 6B, the second head 863 and the third head 864 are integrally formed as illustrated in FIG. 6C. As used herein, "integrally" is used to indicate formed to be a single unit or piece rather than combining separate elements. A groove 865 is formed at the distal end of the first head 862. The integral second and third head 863 and 864 is coupled into the groove 865.

Figure 7A:
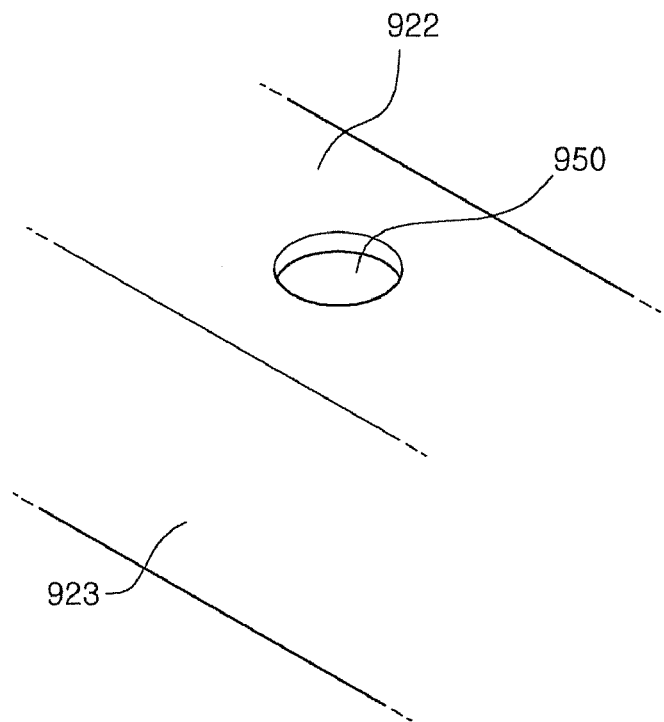
Figure 7C:
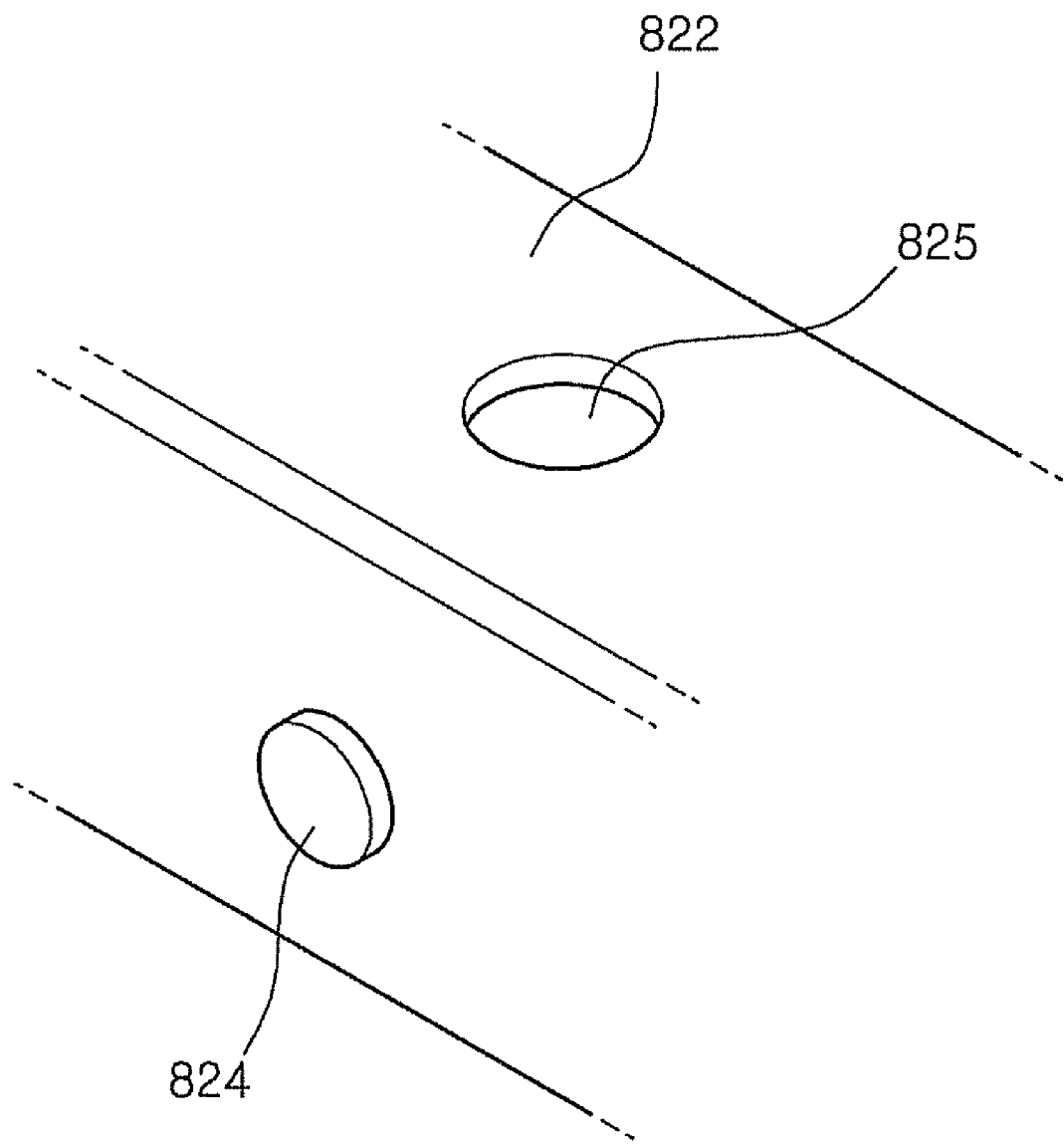
FIGS. 7C and 7D are perspective and sectional views, respectively, showing an exemplary embodiment of a side mold frame formed with a coupling hole to be coupled with the protrusion.
Figure 7D:
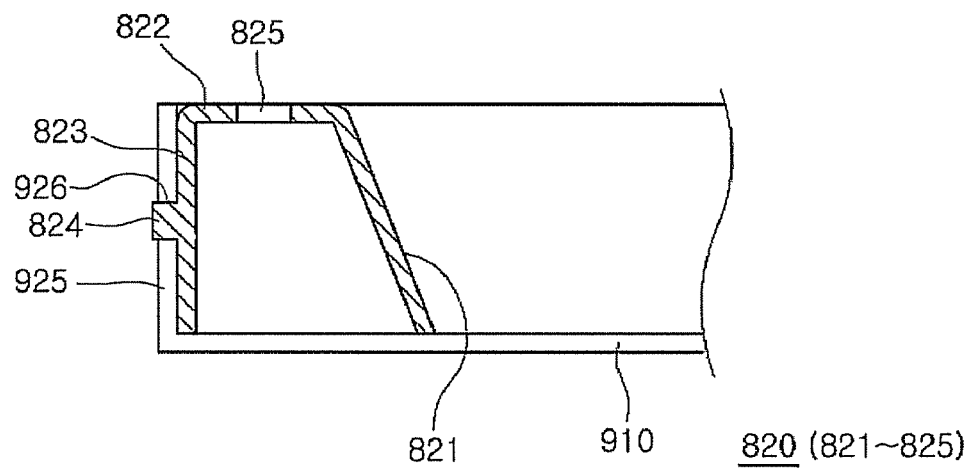
Figure 8:
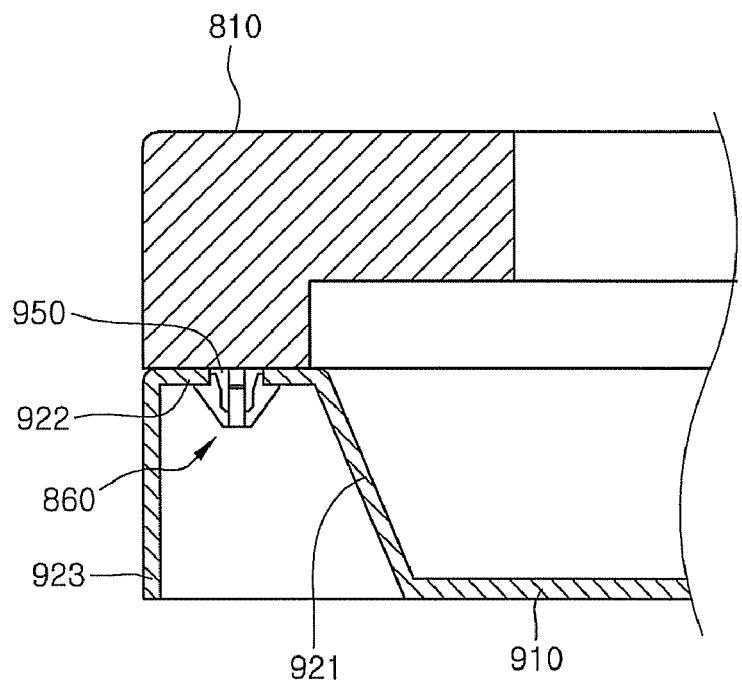
FIG. 8 is a cross-sectional view showing an exemplary embodiment of a coupling state of a protrusion and a coupling hole.

FIGS. 7A and 7B are perspective and sectional views, respectively, showing an exemplary embodiment of the bottom chassis which is formed with the coupling hole coupled with the protrusion, FIGS. 7C and 7D are perspective and sectional views, respectively, showing an exemplary embodiment of the side mold frame formed with the coupling hole coupled with the protrusion and FIG. 8 is a cross-sectional view showing an exemplary embodiment of a coupling state of the protrusion and the coupling hole.

Referring to FIGS. 7A and 7B, among the long sidewalls 924 extending from the second base plate 910 of the bottom chassis 900, the coupling holes 950 are formed in the second bending surface 922 that supports the first base plate 810 of the middle mold frame 800 thereon. Although each of the coupling holes 950 is formed in a substantially circular shape in order to insert the protrusion 850 (see FIG. 5) thereinto, the shape of the coupling holes 950 are not limited thereto and may be changed in various forms depending on the shape of the first protrusion. In exemplary embodiments, the location, shape and/or dimensions of the coupling holes 950 are designed to correspond to the location, shape and/or dimensions of the first protrusion. In one exemplary embodiment, the coupling holes 950 may include a rectilinear or polygonal shape.

Referring to FIGS. 7C and 7I), the side mold frame 820 is coupled to the short sidewall 925 of the bottom chassis 900. The side mold frame 820 includes a first sidewall 821 at an incline from the second base plate 910, the second sidewall 822 bent from the first sidewall 821 in a substantially horizontal (e.g., parallel to the second base plate 910) direction and a third sidewall 823 bent from the second sidewall 822 in a substantially vertically downward direction towards the second base plate 910. The hooks 824 are formed on the third sidewall 823 of the side mold frame 820 and the holes 926 formed in the short sidewall 925 of the bottom chassis 900 such that the hooks 824 of the side mold frame 820 may be coupled to the holes 926.

The coupling holes 825 are formed in the second sidewall 822 of the side mold frame 820 and the protrusions 850 formed along the short sidewall 925 of the middle mold frame 800 (see FIG. 5) are inserted into and coupled to the coupling holes 825.

FIG. 8 shows an exemplary embodiment of a coupling state where the first protrusion 860 formed on the rear side of the first base plate 810 of the middle mold frame 800 is inserted into the coupling hole 950 formed in the second bending surface 922 among the long sidewall 924 of the bottom chassis 900 such that the middle mold frame 800 and the bottom chassis 900 are coupled with each other. The coupling process and structure of the middle mold frame 800 and the side mold frame 820 are substantially identical to those of the middle mold frame 800 and the bottom chassis 900 show in FIG. 8 described in detail below. Thus, descriptions of a coupling process and structure of the middle mold frame 800 and the side mold frame 820 will be omitted.

As in the illustrated embodiment of FIG. 8, of the process of coupling the first protrusion 860 to the coupling hole 950, when the first body 861 and the heads 862 to 864 of the first protrusion 860 are inserted into the coupling hole 950, a gap between the second and third heads 863 and 864 is narrowed to facilitate easier insertion through the coupling hole 950. When the heads 862 to 864 completely penetrate the coupling hole 950, the gap between the second and third heads 863 and 864 is restored into the original state, so that the ends of the respective heads are caught to the coupling hole 950 (e.g., contacting a lower or under surface of the second bending surface 922 and thus firmly coupled to the bottom chassis 900.

Figure 9A:
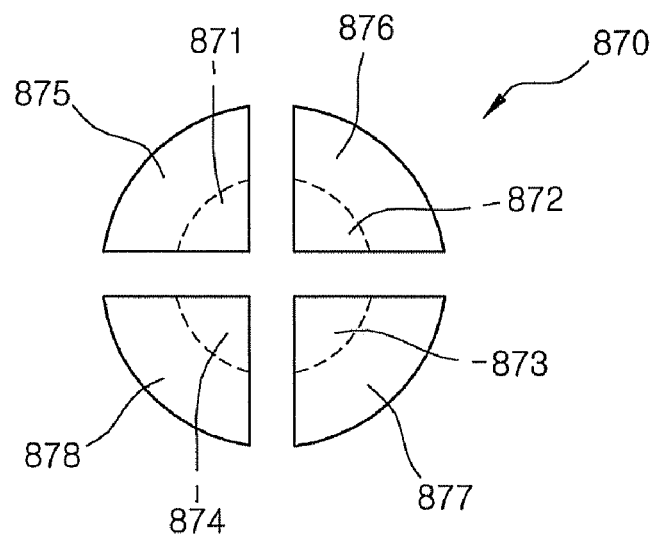
FIGS. 9A and 9B are plane and perspective views, respectively, showing another exemplary embodiment of a protrusion according to the present invention.
Figure 9B:
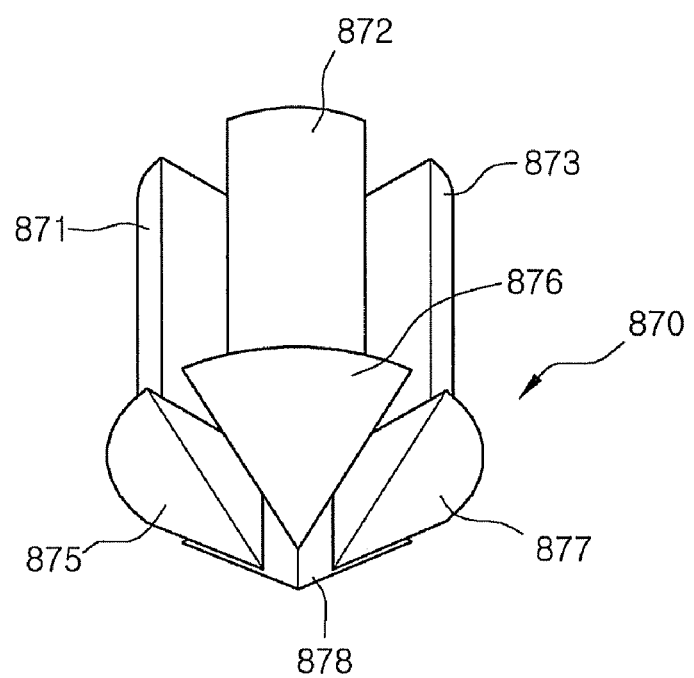

FIGS. 9A and 9B are plane and perspective views, respectively, showing another exemplary embodiment of the protrusion according to the present invention.

Referring to FIGS. 9A and 9B, a plurality of second protrusions 870 are formed on the rear side of the first base plate 810 of the middle mold frame.

Each of the second protrusions 870 includes four second bodies 871 to 874 vertically extending from a rear side of the first base plate 810 of the middle mold frame 800, and four heads 875 to 878 respectively formed at distal ends of the second bodies 871 to 874. The four second bodies 871 to 874 are spaced apart from each other. Each of the four heads 875 to 878 is formed to taper in a direction from an upper end of the second protrusion 870 towards the distal end. Although the number of the bodies or the heads is four in the illustrated embodiment, the numbers of the bodies and/or the heads are not limited thereto. In exemplary embodiments, the number of the bodies corresponds to the number of the heads, but the number may be two or more.

A process of inserting and coupling the second protrusions 870 of the illustrated embodiment and third protrusions of the following illustrated embodiment described below, into the coupling holes of the middle mold frame 800 and the bottom chassis 900 is substantially identical or similar to the process of inserting and coupling the first protrusions 860 into the coupling holes, as described above, so that the descriptions of the process of inserting and coupling the second protrusions 870 and third protrusions will be omitted.

Figure 10A:
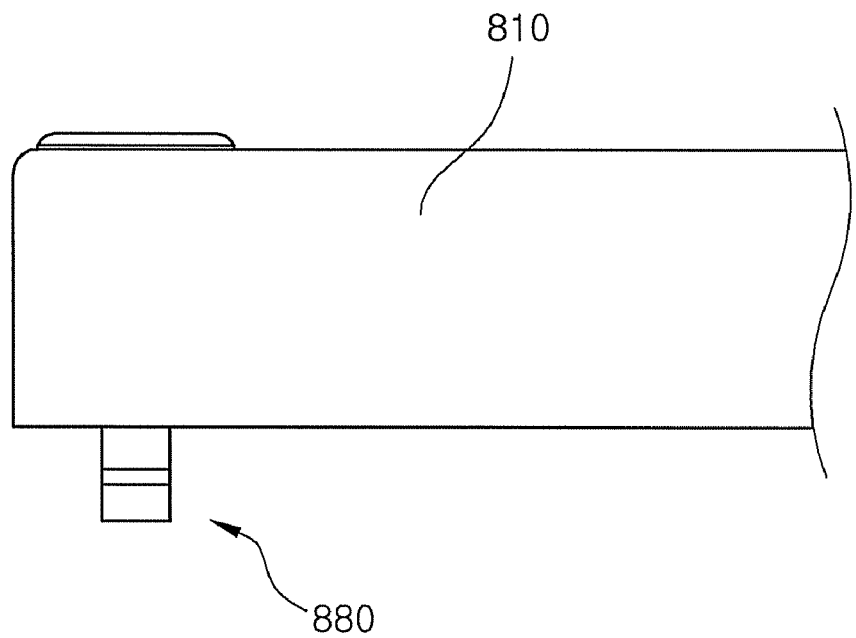
FIGS. 10A and 10B are front and side views, respectively, showing another exemplary embodiment of a protrusion according to the present invention.
Figure 10B:
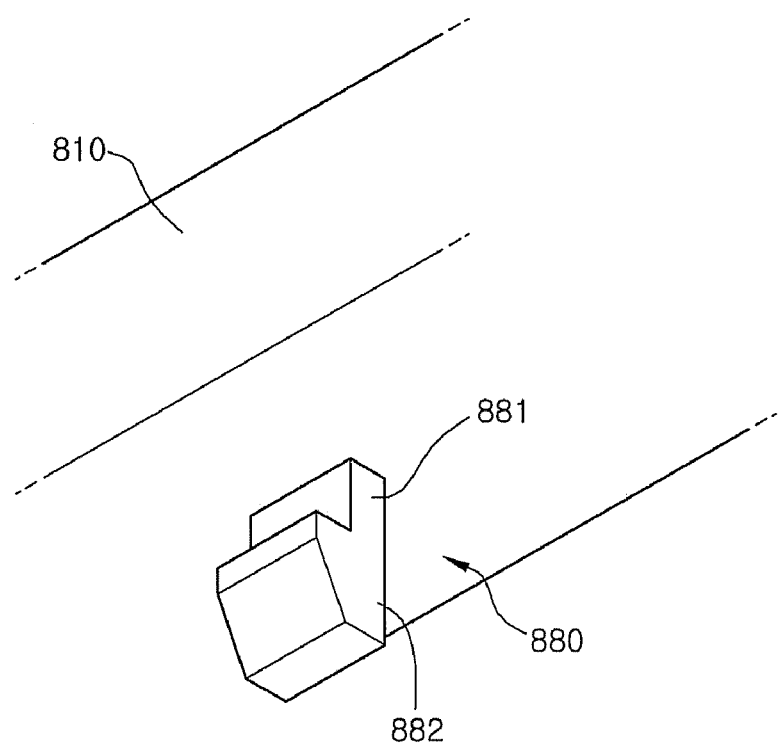
Figure 11:
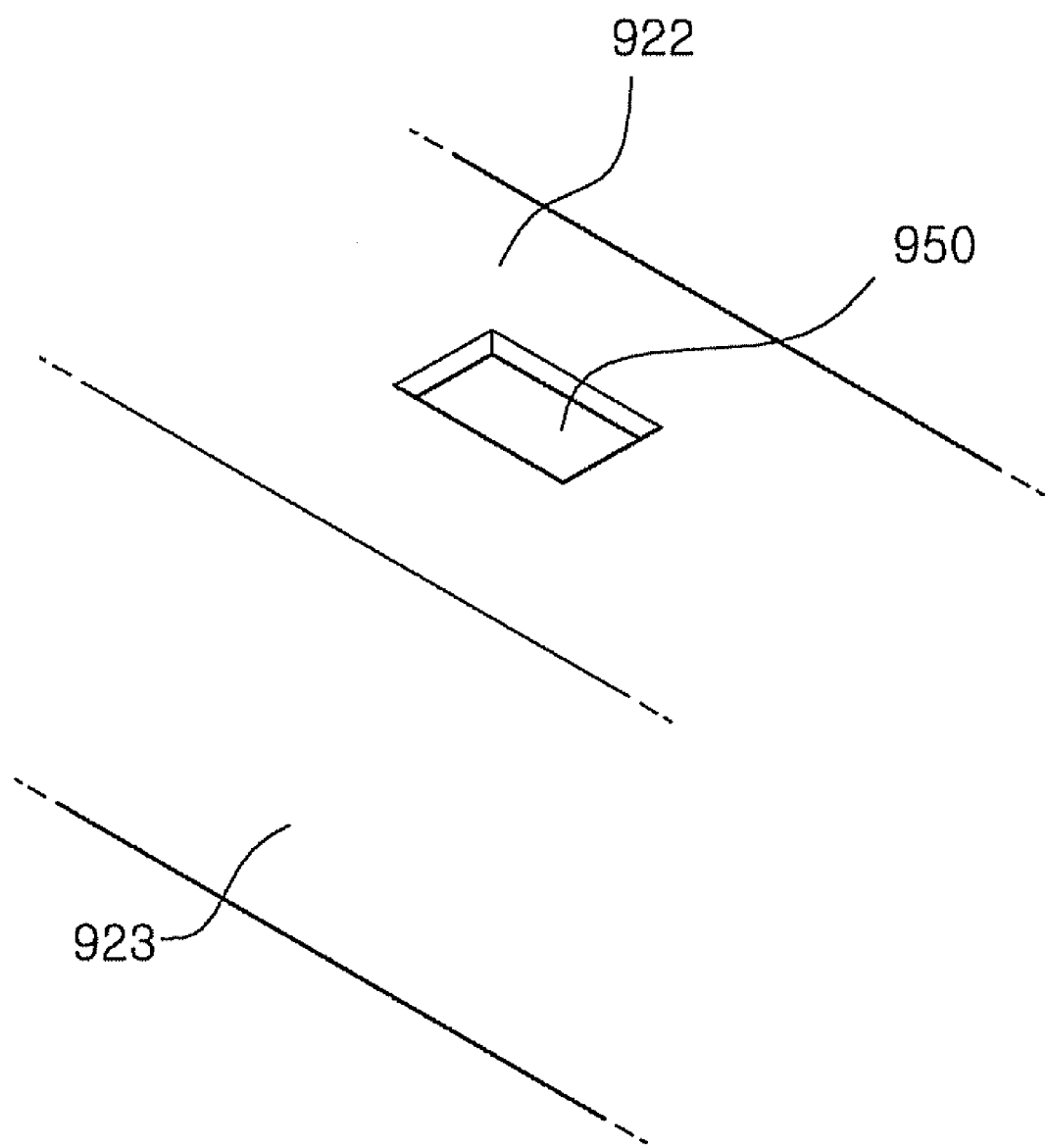
FIG. 11 is a perspective view showing another exemplary embodiment of a bottom chassis formed with a coupling hole to which the protrusion shown in FIGS. 10A and 10B is coupled.

FIGS. 10A and 10B are front and side views, respectively, showing another exemplary embodiment of a protrusion according to the present invention and FIG. 11 is a perspective view showing another exemplary embodiment of a bottom chassis formed with a coupling hole to which the protrusion shown in FIGS. 10A and 10B is coupled.

Referring to FIGS. 10A and 10B, a plurality of third protrusions 880 are formed on the rear side of the first base plate 810 of the middle mold frame 800.

Each of the third protrusions 880 includes a third body 881 vertically extending from a rear side of the first base plate 810 and a head 882 formed at a distal end of the third body 881. The head 882 is formed to taper in a direction from the first base plate 810 to the distal end In an exemplary embodiment, the third protrusion 880 is made of material with predetermined elasticity so as to be easily inserted into a rectangular coupling hole 950, such as is shown in FIG. 11.

Figure 12:
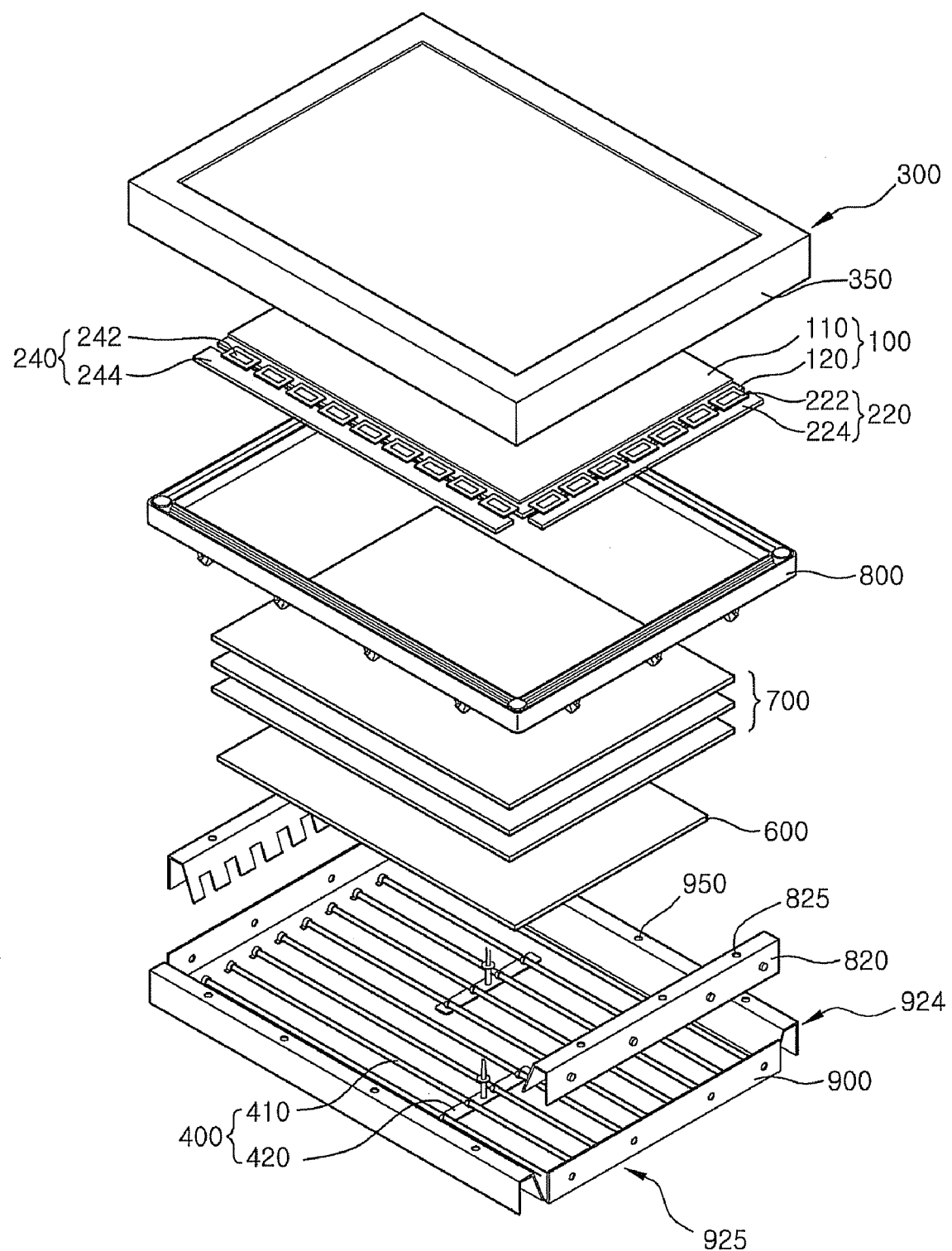
FIG. 12 is an exploded perspective view showing another exemplary embodiment of an LCD having a coupling structure of a mold frame and a bottom chassis according to the present invention.

FIG. 12 is an exploded perspective view showing another exemplary embodiment of an LCD having a coupling structure of the mold frame and bottom chassis according to the present invention.

Referring to FIG. 12, the LCD includes a top chassis 300, an LCD panel 100, driving circuits 220 and 240, a diffusion plate 600, a plurality of optical sheets 700, a lamp unit 400, a middle mold frame 800, side mold frames 820 and a bottom chassis 900.

The bottom chassis 900 has a predetermined receiving space formed therein A backlight unit including the lamp unit 400 is arranged in the receiving space of the bottom chassis 900. The side mold frames 820 are arranged corresponding to the short sidewalls 925 of the bottom chassis 900.

The lamp unit 400 comprises a plurality of lamps 410 and a lamp supporter 420. As the lamp 410, a cold cathode ray lamp is effectively used. In an exemplary embodiment, the lamp 410 may be formed in an "I" shape, but its shape is not limited thereto and may be various. The lamp supporter 420 supports the lamp 410 and also supports the diffusion plate 600. Although a direct-type backlight unit is illustrated as an exemplary embodiment of the backlight unit, the present invention is not limited thereto and may be applied to an edge-type backlight unit.

The diffusion plate 600 and the plurality of optical sheets 700 are placed on upper surfaces of the bottom chassis 900 and the side mold frame 820, respectively. In exemplary embodiments, bosses or protrusions (not shown) may be formed on the upper surfaces of the bottom chassis 900 and/or the side mold frame 820, while holes (not shown) may be formed in the diffusion plate 600 and/or the plurality of optical sheets 700, in order to enhance a coupling force between the bottom chassis 900, side mold frame 820, diffusion plate 600 and/or the optical sheets 700.

As illustrated in FIG. 12, the middle mold frame 800 is coupled to the bottom chassis 900, thus fixing the diffusion plate 600 and the plurality of optical sheets 700.

The bottom chassis 900 is installed to bottom parts of the middle mold frame 800 and the side mold frame 820. The bottom chassis 900 is coupled with the middle mold frame 800 to close a receiving space formed between the bottom chassis 900 and the middle mold frame 800.

The LCD panel 100 displaying images is arranged on (e.g., above) the middle mold frame 800.

The driving circuits 220 and 240 are connected to the LCD panel 100. The driving circuits 220 and 240 include a gate-side printed circuit board ("PCB") 224 having a control integrated circuit ("IC") mounted thereon, and applying a predetermined gate signal to a gate line of a TFT substrate 120 which faces a color filter substrate 110, a data-side PCB 244 having a control IC mounted thereon and applying a predetermined data signal to a data line of the TFT substrate 120, gate-side flexible PCBs 222 for connecting the TFT substrate 120 to the gate-side PCB 224, and data-side flexible PCBs 242 for connecting the TFT substrate 120 to the data-side PCB 244. The gate-side and data-side PCBs 224 and 244 are respectively connected to the gate-side and data-side flexible PCBs 222 and 242 so as to apply a gate driving signal and an external image signal thereto. In an exemplary embodiment, the gate-side and data-side PCBs 224 and 244 may be integrated to form a single PCB. Driving ICs (not shown) may be mounted on the flexible PCBs 222 and 242 to transmit a RGB (Red, Green and Blue) signal generated from the PCBs 224 and 244 and power to the LCD panel 100.

The top chassis 300 is coupled to the bottom chassis 900 in order to cover a peripheral edge portion of the LCD panel 100, e.g., a non-displaying region, and an outer side of the middle mold frame 800. A sidewall 350 of the top chassis 300 may overlap the outer side of the middle mold frame 800.

As described above in the exemplary embodiments, hooks (not shown) to be coupled to the coupling grooves (not shown) of the middle mold frame may be formed in the sidewalls of the bottom chassis 900, as illustrated in FIGS. 1A to 4. Alternatively, a plurality of coupling holes 950 for allowing a plurality of protrusions 850 of the middle mold frame 800 to be inserted thereinto are formed in the support surfaces of the long sidewalls 924 of the bottom chassis 900, allowing the first base plate 810 of the middle mold frame 800 to be placed thereon, as illustrated in FIG. 5. In addition, a plurality of coupling holes 825 may be formed in one sidewall of the side mold frame 820 so that the plurality of protrusions 850 formed on the middle mold frame 800 may be inserted therein, as illustrated in FIG. 5.

Since the middle mold frame 800 includes no sidewall extending downward towards the bottom chassis 900, the middle mold frame 800 dose not cover the sidewalls 920 of the bottom chassis 900. Thus, sidewalls of the top chassis 300 are essentially directly coupled to the sidewalls 920 of the bottom chassis 900 to be in contact therewith, thereby increasing a contact area between the bottom chassis 900 and the top chassis 300.

Although the illustrated exemplary embodiments have been described based on an LCD among flat panel displays, a flat panel display provided with a coupling structure for coupling a flat panel display module and a case according to the present invention is not limited to the LCD. In one exemplary embodiment, the aforementioned coupling structure may be applied to various kinds of flat panel displays such as an organic light emitting device ("OLED") using a principle (referred to as "electroluminescence") in which when a light emitting material made of an organic material or conjugated polymer with a semiconductor property is interposed between two electrodes and a voltage is then applied thereto, light is generated from the organic material or polymer while a current flows into the light emitting material.

In one exemplary embodiment, the coupling structure of the illustrated embodiment may be applied to other types of flat panel displays such as a plasma display panel ("PDP") in which a plurality of small cells are arranged between two substrates and gas (e.g., neon or argon) discharge is generated between (e.g., positive and negative) electrodes above and below the substrates. The cells cause self luminescence through ultraviolet rays generated by the gas discharge, thereby reproducing color images.

As claimed in the appended claims, the scope of the present invention should be understood to include various changes and modifications made by those having ordinary skill in the art without departing from the spirit of the present invention.

As in the illustrated exemplary embodiments, a middle mold frame is arranged on an upper surface of a bottom chassis or on the upper surface of the bottom chassis and side mold frames. The middle mold frame may be coupled and fixed through coupling members of the middle mold frame and the bottom chassis. Advantageously, a sidewall of the middle mold frame is excluded, thereby reducing the material cost of a display device. In addition, since a sidewall of the middle mold frame is excluded, a contact area between the top chassis and the bottom chassis is increased, whereby EMI may be greatly improved.

What is claimed is:

1. A flat panel display comprising:
    a first mold frame including:
        a first base plate with an inside region opened; and
        a plurality of first coupling members protruding from a rear side of the first base plate; and
    a bottom chassis including:
        a second base plate;
        a plurality of sidewalls extending from the second base plate; and
        a plurality of second coupling members formed on the plurality of sidewalls and coupled with the plurality of first coupling members,
    wherein
    each of a portion of the plurality of sidewalls of the bottom chassis includes:
        a first bending surface bent and extending in a first direction from the second base plate,
        a second bending surface bent and extending in a second direction from the first bending surface, and
        a third bending surface bent and extending in a third direction from the second bending surface,
    the second direction is substantially parallel with the second base plate, and
    a first portion of the second coupling members is on the second bending surface of the bottom chassis.

2. The flat panel display as claimed in claim 1, wherein the bottom chassis further includes a second mold frame coupled to a remaining portion of the plurality of sidewalls of the bottom chassis, wherein the second mold frame includes a first sidewall, a second sidewall formed to be bent from the first sidewall and a third sidewall formed to be bent from the second sidewall.

3. The flat panel display as claimed in claim 2, wherein a second portion of the second coupling members is on the second sidewall of the second mold frame.

4. The flat panel display as claimed in claim 1, wherein each of the first coupling members includes a coupling plate including a coupling groove formed therein, and each of the second coupling members includes a hook plate extending from the bottom chassis towards the first mold frame and a hook protruding from the hook plate, wherein the hook the second coupling member is coupled with the coupling groove of the first coupling member.

5. The flat panel display as claimed in claim 1, wherein each of the first coupling members includes a protrusion and each of the second coupling members includes a coupling hole into which the protrusion is inserted.

6. The flat panel display as claimed in claim 5, wherein the coupling hole is formed corresponding to the shape of the protrusion and the coupling hole has a polygonal or circular shape.

7. The flat panel display as claimed in claim 5, wherein the protrusion includes a first protrusion having a first body vertically extending from the rear side of the first base plate, a first head formed at a distal end of the first body, a second head arranged crossing the first head and a third head arranged crossing the first head and opposing the second head, and
    wherein each of the second and third heads having a portion spaced apart from the first body and the first head by a predetermined length.

8. The flat panel display as claimed in claim 7, wherein the second and third heads are integrally formed into a single unit, and the second and third heads integrally formed are coupled into a groove formed in the distal end of the first head.

9. The flat panel display as claimed in claim 7, wherein the first head, the second head and the third had are tapered in a direction from the rear side of the first base plate towards the distal end.

10. The flat panel display as claimed in claim 5, wherein the protrusion includes a second protrusion having at least two second bodies vertically extending from the rear side of the first base plate and heads respectively formed at a distal end of each of the second bodies.

11. The flat panel display as claimed in claim 10, wherein the second bodies are spaced apart from each other and each of the heads is tapered in a direction from the rear side of the first base plate towards the distal end.

12. The flat panel display as claimed in claim 5, wherein the protrusion includes a third protrusion including a third body vertically extending from the rear side of the first base plate and a head formed at a distal end of the third body.

13. The flat panel display as claimed in claim 12, wherein the head tapers in a direction from the rear side of the first base plate to the distal end.

14. The flat panel display as claimed in claim 1, further comprising a display panel disposed over the first mold frame and displaying images, and a top chassis coupled with the bottom chassis and covering the display panel.

15. The flat panel display as claimed in claim 14, wherein the display panel includes a liquid crystal display panel, and a backlight unit providing light to the liquid crystal display panel.

16. A method of forming a panel display, the method comprising:
    forming first coupling members on a first mold frame, the first coupling members protruding in a direction from a rear side of the first mold frame towards a bottom chassis;

forming second coupling members on the bottom chassis, the bottom chassis including a second base plate and a sidewall portion, the second coupling members formed on the sidewall portion; and coupling the first mold frame to the bottom chassis, wherein a first coupling member of the first mold frame is coupled to a second coupling member of the bottom chassis, wherein the sidewall portion of the bottom chassis includes:
- a first bending surface bent and extending in a first direction from the second base plate,
- a second bending surface bent and extending in a second direction from the first bending surface, and
- a third bending surface bent and extending in a third direction from the second bending surface, the second direction is substantially parallel with the second base plate, and a portion of the second coupling members is on the second bending surface of the bottom chassis.

17. The method as claimed in claim 16, wherein the forming second coupling members includes coupling a second mold frame to the bottom chassis, the second mold frame including a portion of the sidewall portion of the bottom chassis.

* * * * *